Figure 2:
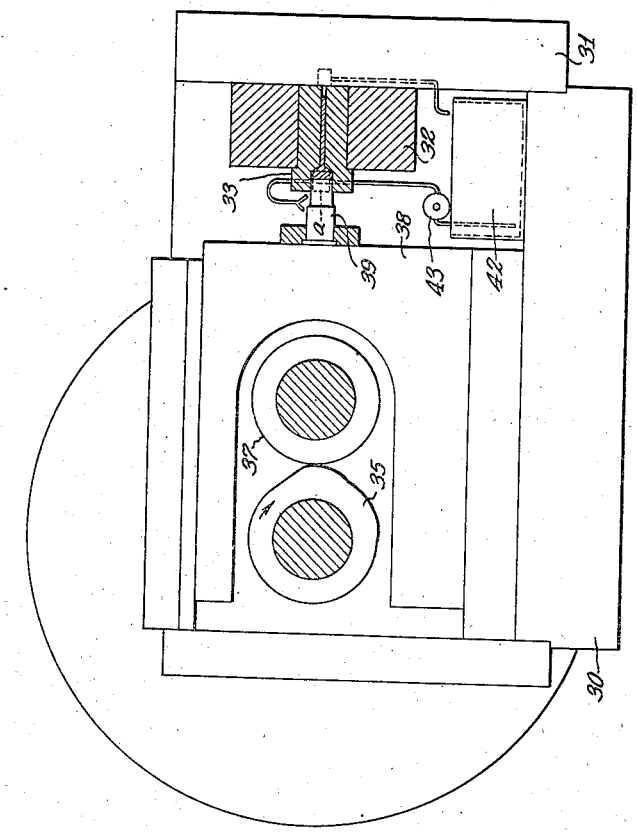

Nov. 23, 1943.  J. H. HOERN  2,334,927
HOT EXTRUSION OF METAL ARTICLES
Filed Nov. 18, 1940  2 Sheets-Sheet 1

INVENTOR.
Joseph H. Hoern
BY John F. Stark

Nov. 23, 1943.            J. H. HOERN            2,334,927
HOT EXTRUSION OF METAL ARTICLES
Filed Nov. 18, 1940           2 Sheets-Sheet 2

INVENTOR.
Joseph H. Hoern
BY John F. Stark

Patented Nov. 23, 1943

2,334,927

UNITED STATES PATENT OFFICE 2,334,927

HOT EXTRUSION OF METAL ARTICLES

Joseph H. Hoern, Birmingham, Mich., assignor to Eaton Manufacturing Company, Cleveland, Ohio, a corporation of Ohio Application November 18, 1940, Serial No. 366,111

3 Claims. (Cl. 207—10)

This invention relates generally to a hot extrusion process for forming headed articles from blanks or billets and, more particularly, concerns a method of hot extruding headed articles such as poppet valves used in internal combustion engines.

Hot extrusion processes have been known for many years and carried on until recently by the use of crank presses. As thus practiced, the process was capable of producing tubes and solid shapes but only under strict limitations with regard to the cross sectional area of the extruded product. It was discovered that by increasing the extruding speed the scope of the process was greatly enlarged so as to make possible extrusion of alloy steels especially resistant in the hot state, such as the stainless nickel-chromium-iron alloys.

In the present invention it has been discovered that a cam operated machine of novel design would produce the desired results without excessive tool wear. The main objection to the present common practice of extruding articles by use of a vertical press operated by a crankshaft is that the actual extruding operation starts during the second quadrant of the crank cycle, making the extruding speed for the first stages of extruding considerably faster than the subsequent stages, when the crank exerts the greatest amount of pressure at a time it is least needed, as when the crank approaches dead center; thus the speed of the extruding tool is very slow and subjected to extremely high pressures and rapid wear of the extruding die, due principally to the rapid cooling of the billet, which is caused by the billet being in contact with the extruding punch and die for a long period of time during the last stages of the crank cycle.

The present invention contemplates the provision of a novel method of extruding headed articles involving a cam operated press, as distinguished from a crank press, in which by proper shaping of the lobe of the cam operating the extruding punch of the improved press, the billet extrusion in its initial stages is begun at a slow speed, then gradually increasing extruding speed during subsequent stages of extrusion whereby the extruding die and punch are not subjected to excessive pressures and rapid wear, which occurs when a crank press is used, as above mentioned. With the present improved cam operated press the billet extruding speed is relatively increased during the final stages of billet extrusion whereby the billet temperature is actually increased, thus resulting in lower pressures necessary, longer tool life, and accurate forming of extruded articles at a great reduction of cost. Contrasted with a conventional crank press, as above mentioned, which permits the billet to cool rapidly as the crank approaches dead center, causing great damage to the extrusion tools and extremely high pressures and rapid wear, the advantages of the present method of extruding represents a major advance in this art.

Accordingly the primary object of the present invention is the provision of a novel method of extruding headed articles and the like which involves preheating the billet to be extruded, introducing the heated piece to the container for the billet, and causing extrusion therefrom at slow speed during the initial stage of operation and relatively increasing extruding speed to a maximum amount during the final stage of billet extrusion; the provision in a method of extrusion, as above described, in which the final billet extruding speed is greatly in excess of initial extruding speed, whereby the initial temperature of the preheated billet is elevated during the final stages of billet extrusion, thus reducing the amount of pressure necessary and increasing the useful life of the tools.

Further and other objects and advantages of the present invention reside in the novel combination and arrangement of the process steps and will be apparent from the following disclosures, when taken in conjunction with the accompanying drawings forming a part of this specification.

Figure 1:
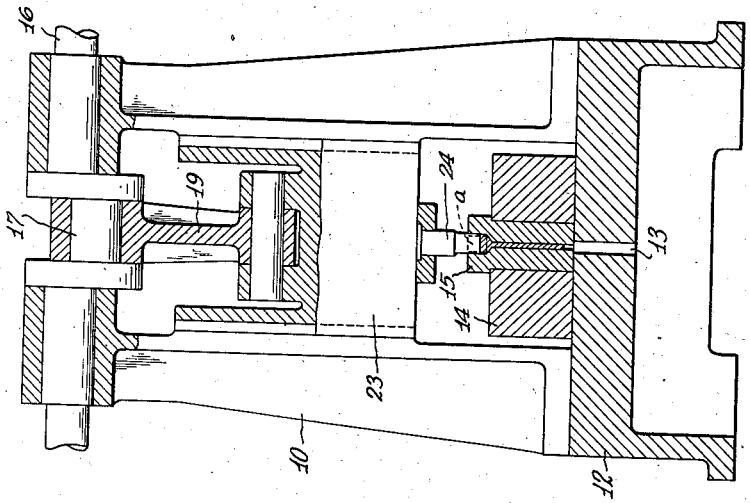
Figure 3:
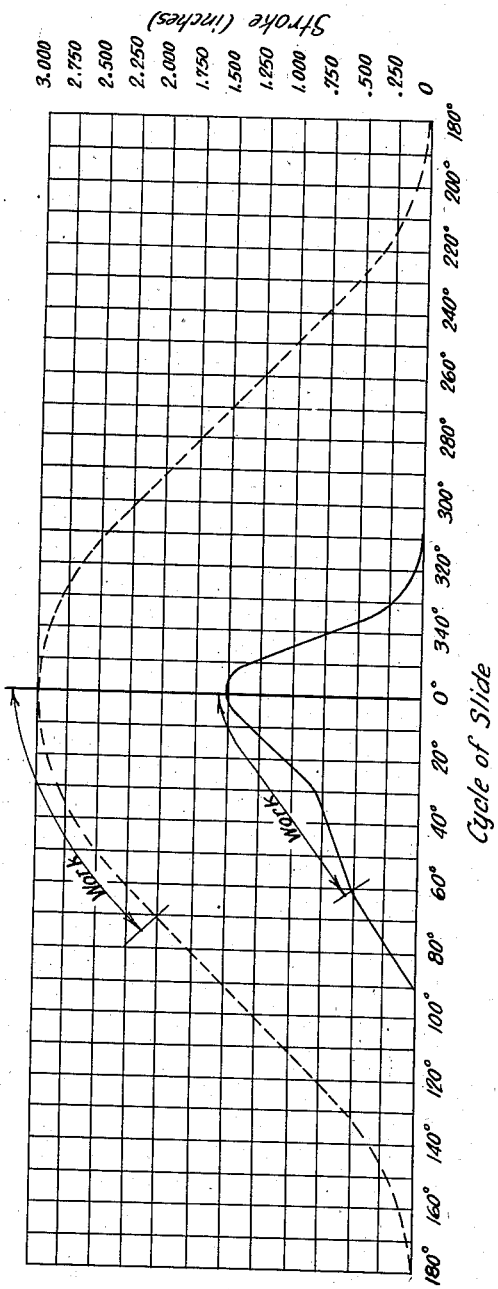
Figure 4:
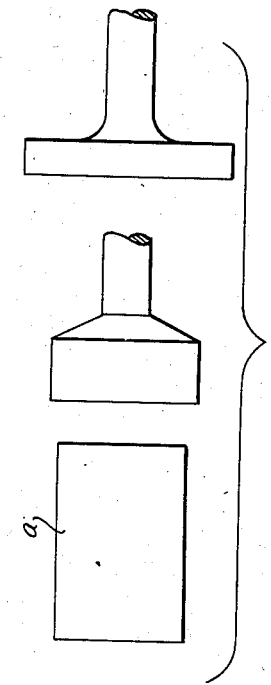

In the drawings, like reference characters denote corresponding parts in the several views, and in which:

Fig. 1 is an elevational view, with parts in section, showing a conventional extrusion press of the crank type; and Fig. 2 is a similar elevational view, with parts in section, of an improved extrusion press of the cam type utilized in the teaching of the improved method of this invention; and Fig. 3 is a diagram illustrating a graph comparing the operation of a conventional crank press and the results obtained according to the method of operation of the press of the present invention; and Fig. 4 is another diagram representing an analogy between the same devices in which useful stroke has been plotted against pressure.

Figure 5:
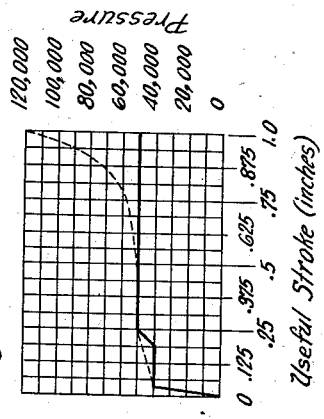

Fig. 5 is an illustration of a suitable work piece illustrating progressive stages from the original billet to the final shape of the headed article.

Having reference to the drawings, in Fig. 1 the conventional crank press illustrated may comprise a frame 10, carrying at the lower part thereof, a fixed table 12 formed with a central bore 13 to accommodate the extruded article. Upon the table is a die container 14 within which is received billet container 15. In the upper part of the press frame is mounted a suitably driven crankshaft 16, having a crank arm 17. A pitman 19 is connected at one end to the crank arm and at the other end to carrier 23, slidably mounted in suitable parts of the frame 10. From the lower end of carrier 23 an extruding punch 24 extends downwardly.

A billet designated $a$, which is preheated to the desired temperature is then placed in the container 14 and the press set in operation. As the crank arm 17 revolves the punch-carrier will descend until the punch contacts with the top of the billet, whereafter the billet will be expanded by the punch to fill the billet container and then extruded until the punch-carrier comes into engagement with the top wall of the billet container. Extrusion in this vertical crank-type press is actually conducted during the second quadrant of the crank cycle, and as hereinbefore mentioned, this results in an initial extruding speed considerably faster than the subsequent stages of extruding, because when the crank approaches dead center the speed of the extruding tool is very slow, thus permitting the billet to cool somewhat in the die aperture and subjecting the tool to extremely high pressures, due to the extended period of time during the last stages of the crank cycle.

In Fig. 3 the graph shown in broken line illustrates the cycle of slide in degrees plotted in relation to the stroke of the press, and referring particularly to the conventional crank above mentioned, with an assumed crank stroke of 3", and rotated at 60 revolutions per minute, it will be apparent that the actual extruding operation or useful work of the cycle occupies a relatively short interval of time as compared to the total time element that the billet is in contact with the extruding tool.

Further reference to the graph of Fig. 4 shows in broken line, the useful stroke of the work cycle plotted in relation to the pressure in pounds on the extruding tool, for the same crank press above mentioned. This clearly depicts the extreme pressure rise upon the extruding tool during the final stage of the extruding operation, which as above mentioned results in undue wear and tear upon the tool life.

Now having reference to Fig. 2 there is illustrated an elevational view, with parts in section somewhat similar to Fig. 1, of an improved cam operated press as an example for accomplishing the improved method of this invention. The particular form of press shown comprises a frame 30 carrying at one end thereof a fixed upstanding table 31. Extending laterally from the table and fixed thereto is a hollow die container 32, adapted to receive a billet container 33. Adjacent the opposite end of the frame and disposed centrally thereof is a camshaft having a suitable cam lobe 35 which may be driven by any suitable power means not shown. The cam 35 during rotation actuates a roller 37 rotatably secured to carrier 38, which is adapted to slide laterally in adjacent frame parts, as shown. An extruding punch 39 is secured to and projects laterally from the carrier 38 in line with the billet container, and, upon rotation of the cam 35, presses the billet $a$ to initially expand the same to fill the billet container and thereafter to complete the extrusion operation. By proper selection and shaping of the cam lobe, billet extrusion in its initial stages is conducted at a relatively slow speed and then gradually increased during subsequent stages to a maximum amount at the final extruding speed which is relatively faster than the initial speed. For cooling the punch and die cavity a sump 42 is shown, which may contain any suitable coolant, and a pump 43 circulates the coolant through the die cavity and over the punch and back to the sump before and/or after the punch is brought in contact with billet, which not only lubricates and cools the die but also removes foreign matter therefrom by means of a single medium.

In Fig. 3, there has been superimposed upon the graph illustrating the cycle of slide and stroke of the conventional crank press, a curve, in full line, obtained from the improved cam press of Fig. 2, and illustrating by comparison the increased cycle of useful work for the reduced stroke and cycle of slide, and which also results in quick return of the punch from the heated article and permits it to cool before operating on the next billet.

Fig. 4 there is a similar graph, shown in full line, for the improved cam operated press superimposed upon the curve obtained from a conventional crank press and illustrating by comparison the extreme reduction in tool pressure during the final stages of the useful stroke of extruding as obtained from practicing the present improved method of operation. Extrusion of headed articles by this improved method of progressively increased extruding speed from the initial to the final stages of operation has resulted in satisfactory tool life and accurate work at a great reduction in cost because operations may be carried on at continuous high speeds.

Fig. 5 represents somewhat diagrammatically the original billet $a$ and progressive stages of the billet extruded to its semi-finished form, which in the instant case represents a headed article, namely a poppet valve. Thereafter the head portion is further forged by moving the blank to another die for shaping the head of the valve to the desired size. It has been found practical to extrude pieces by the practice of this method to a stage in which the thickness of the head portion of the headed part is equal to or greater than the stem diameter.

Formal changes may be made in the practice of the above disclosed method, which come within the objects and advantages of the present invention first enumerated and achieved, and hence, it is intended that all matter contained in the above description or shown in the accompanying drawings shall be interpreted as illustrative and not in a limiting sense, without departing from the scope of the present invention as defined by the following claims.

What I claim is:

1. The method of forming articles having a stem and head portion from preformed heated metal billets comprising the steps of, placing a preformed heated metal billet in a cavity, applying a punch to one end of said billet thereby expanding said billet, continuing the movement of said punch at relatively higher speed, whereby the billet is extruded at higher speeds during the last stages of the extruding operation, quickly removing the punch from the billet when the extrusion is finished to prevent the punch from absorbing heat from the head of the extruded article, and passing a liquid coolant over said punch to reduce the temperature thereof prior to bringing said punch in contact with another billet.

2. The method of forming articles having a stem and head portion from preformed heated metal billets comprising the steps of, placing a preformed heated metal billet in a cavity, applying a punch to one end of said billet thereby expanding said billet, continuing the movement of said punch at relatively higher speed, whereby the billet is extruded at higher speeds during the last stages of the extruding operation, quickly removing said punch from said billet when the extrusion is finished to prevent the punch from absorbing heat from the head of the extruded article, and passing a liquid coolant through said cavity and over said punch to reduce the temperature thereof prior to placing another billet in said cavity and bringing said punch in contact therewith.

3. The method of forming articles having a stem and head portion, in which the thickness of the head portion is equal to or greater than the stem diameter, from preformed heated metal billets comprising the steps of, placing a preformed heated metal billet in a cavity, applying a punch to one end of said billet thereby expanding said billet, continuing the movement of said punch at relatively higher speed, whereby the billet is extruded at higher speeds during the last stages of the extruding operation, quickly removing said punch from said billet when the extrusion is finished to prevent the punch from absorbing heat from the head of the extruded article, and passing a liquid coolant through said cavity and over said punch to reduce the temperature thereof prior to repeating another extrusion cycle.

JOSEPH H. HOERN.